United States Patent [19]

Gibbon et al.

[11] Patent Number: 4,574,066

[45] Date of Patent: Mar. 4, 1986

[54] PROCESS FOR THE EXPEDITIOUS FORMATION OF A HIGH STRENGTH SHAPED ARTICLE OF POLY(6-OXY-2-NAPHTHOATE-4-OXYBENZOATE)

[75] Inventors: John D. Gibbon, Charlotte, N.C.; Terry E. Lawler, Helena, Ala.; Hyun-Nam Yoon, Summit; Larry F. Charbonneau, Chatham, both of N.J.

[73] Assignee: Celanese Corporation, New York, N.Y.

[21] Appl. No.: 583,643

[22] Filed: Feb. 27, 1984

[51] Int. Cl.$^4$ .................... D01D 1/02; D01D 5/08; D01D 10/02

[52] U.S. Cl. .................... 264/85; 264/176 F; 264/234; 264/211; 528/190; 524/599

[58] Field of Search .................... 264/85, 176 F, 234, 264/211; 528/190; 524/599

[56] References Cited

U.S. PATENT DOCUMENTS

| | | | |
|---|---|---|---|
| 1,593,816 | 7/1926 | Andre | 562/425 |
| 3,975,487 | 8/1976 | Cottis et al. | 264/210.4 |
| 4,161,470 | 7/1979 | Calundann | 528/190 |
| 4,183,895 | 1/1980 | Luise | 264/176 F |
| 4,219,461 | 8/1980 | Calundann | 528/190 |
| 4,247,514 | 1/1981 | Luise | 264/85 |
| 4,287,357 | 9/1981 | Mueller et al. | 562/425 |
| 4,329,494 | 5/1982 | Montgomery | 562/425 |
| 4,337,190 | 6/1982 | Calundann | 524/599 |
| 4,345,094 | 8/1982 | Mueller et al. | 562/425 |
| 4,345,095 | 8/1982 | Mueller et al. | 562/425 |
| 4,393,191 | 7/1983 | East | 528/190 |
| 4,395,513 | 7/1983 | Calundann | 524/599 |
| 4,424,184 | 1/1984 | Eskridge et al. | 264/346 |
| 4,429,105 | 1/1984 | Charbonneau | 528/190 |
| 4,431,770 | 2/1984 | East et al. | 524/599 |
| 4,473,682 | 9/1984 | Calundann et al. | 528/190 |

FOREIGN PATENT DOCUMENTS

WO83/02424 7/1983 PCT Int'l Appl. .

*Primary Examiner*—Donald Czaja
*Assistant Examiner*—Hubert C. Lorin
*Attorney, Agent, or Firm*—Forrest D. Stine

[57] ABSTRACT

Melt extruded poly(6-oxy-2-naphthoate-4-oxybenzoate) shaped articles of relatively high strength and modulus are produced in a lesser period of time than commonly heretofore required in the prior art. The required polymer is capable of exhibiting an anisotropic melt phase and is formed through the reaction of 6-acetoxy-2-naphthoic acid and 4-acetoxybenzoic acid under a combination of melt polymerization conditions which surprisingly has been found to yield a shaped article following melt extrusion which may be heat strengthened in an unusually brief period of time (i.e. two hours or less). The polymerization is catalyzed by a potassium salt (e.g. potassium acetate), and the polymerization conditions require a relatively highly elevated final polymerization temperature. Substantially all of the acetic acid by-product is removed from the polymerization zone prior to concluding the polymerization under reduced pressure conditions. The process of the present invention through the reduction of the required heat strengthening time accordingly makes possible a substantial productivity increase for a given production facility.

28 Claims, No Drawings

PROCESS FOR THE EXPEDITIOUS FORMATION OF A HIGH STRENGTH SHAPED ARTICLE OF POLY(6-OXY-2-NAPHTHOATE-4-OXYBENZOATE)

BACKGROUND OF THE INVENTION

In recent years thermotropic liquid crystalline polymers have become known to those skilled in polymer technology. Thermotropic liquid crystalline polymers are recognized to be capable of forming an anisotropic melt phase. Briefly, polymers of this type are capable of assuming a parallel ordering of the polymer molecular chains in the melt even under static conditions. These polymers commonly are prepared from monomers which are generally long, flat and fairly rigid along the long axis of the molecule and commonly have chain-extending linkages that are either coaxial or parallel.

The anisotropic character of such polymers in the melt may conveniently be confirmed by polarized light techniques whereby crossed polarizers are utilized. More specifically, the anisotropic melt phase may be observed by the use of a Leitz polarizing microscope at a magnification of 40X with the molten sample on a Leitz hot stage and under a nitrogen atmosphere. The anisotropic polymer melt transmits light under such conditions.

Thermotropic liquid crystalline polymers (as defined) include but are not limited to wholly aromatic polyesters, aromatic-aliphatic polyesters, aromatic polyazomethines, aromatic polyester-carbonates and wholly or non-wholly aromatic polyesteramides. The wholly aromatic polymers are considered to be "wholly" aromatic in the sense that each moiety present in the polymer contributes at least one aromatic ring to the polymer backbone and which enables the polymer to exhibit anisotropic properties in the melt phase. Such moieties may be formed from aromatic diols, aromatic amines, aromatic diacids; and aromatic hydroxy acids.

It further has been recognized that shaped articles formed from such liquid crystalline polymers may have their strengths enhanced by heating in a gaseous atmosphere below the melting temperature. See, for instance, in this regard U.S. Pat. Nos. 3,975,487; 4,161,470; 4,183,895; 4,247,514; and 4,424,184; and PCT International Publication No. WO 83/02424.

Poly(6-oxy-2-naphthoate-4-oxybenzoate) is recognized to be capable of forming an anisotropic melt phase which can be melt, extruded to form shaped articles such as fibers, films and three-dimensional molded articles. This wholly aromatic polyester and routes for its formation are disclosed in commonly assigned U.S. Pat. Nos. 4,161,470 and 4,393,191, and in commonly assigned U.S. Ser. No. 468,240,now U.S. Pat. No. 4,429,105 filed Feb. 22, 1983. It further has heretofore been recognized that shaped articles (e.g., fibers) formed from poly(6-oxy-2-naphthoate-4-oxybenzoate) commonly require many hours of heat treatment in a gaseous atmosphere in order to substantially increase the tenacity thereof. Such relatively long heat treatment time requirements have heretofore substantially extended the required processing times and have adversely impacted upon production economics.

It is an object of the present invention to provide an improved process for the formation of a high strength high modulus shaped article (e.g., fiber, film or three-dimensional molded article) of poly(6-oxy-2-naphthoate-4-oxybenzoate).

It is an object of the present invention to provide an improved process for the formation of poly(6-oxy-2-naphthoate-4-oxybenzoate) which has surprisingly been found to possess qualities which enable it to be more rapidly heat strengthened It is an object of the present invention to provide an improved overall process for the formation of a high strength shaped article of poly(6-oxy-2-naphthoate-4-oxybenzoate) wherein the final heat strengthening step is substantially expedited.

It is an object of the present invention to provide an improved process for the formation of a multifilamentary fibrous material of poly(6-oxy-2-naphthoate-4-oxybenzoate) of high strength and modulus wherein undesirable coalescence or sticking between adjoining filaments is substantially avoided during the expedited heat strengthening step.

It is an object of the present invention to provide an improved process for the formation of a high strength shaped article of poly(6-oxy-2-naphthoate-4-oxybenzoate) wherein the polymer exhibits highly satisfactory heat stability characteristics during subsequent melt processing.

It is another object of the present invention to provide an improved process for the formation of a high strength shaped article of poly(6-oxy-2-naphthoate-4-oxybenzoate) wherein the productivity of a given production facility can be substantially increased because of the reduced time required to accomplish the heat strengthening step.

It is a further object of the present invention to provide an improved process for the formation of a high strength shaped article of poly(6-oxy-2-naphthoate-4-oxybenzoate) which requires a reduced capital investment to accomplish the formation of a specified quantity of product.

It is yet another object of the present invention to provide an improved process for the formation of a high strength shaped article of poly(6-oxy-2-naphthoate-4-oxybenzoate) which exhibits good conversion efficiency from the required raw materials to marketable product.

These and other objects, as well as the scope, nature and utilization of the claimed invention will be apparent to those skilled in the art from the following detailed description and appended claims.

It has been found that an improved process for the expeditious formation of a high strength shaped article of poly(6-oxy-2-naphthoate-4-oxybenzoate) which is capable of forming an anisotropic melt phase comprises:

(a) polymerizing under melt polymerization conditions in a polymerization zone at a temperature above 220° C. approximately 10 to 90 mole percent of monomer I and approximately 10 to 90 mole percent of monomer II with the evolution of acetic acid by-product, wherein monomer I is:

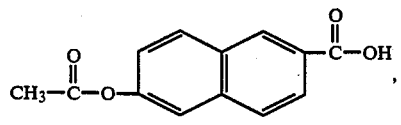

and monomer II

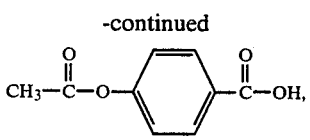

with the polymerization being conducted under a non-oxidizing gaseous atmosphere in the presence of a catalytic quantity of a potassium salt which is capable of catalyzing the polymerization, with the polymerization conditions including a polymerization temperature of at least 320° C. and which exceeds the melting temperature of the polymer product by at least 20° C. while operating at substantially atmospheric pressure until at least 95 percent of the stoichiometric quantity of acetic acid by-product is evolved and removed from the polymerization zone, and a subsequent polymerization temperature of at least 320° C. and which exceeds the melting temperature of the polymer by at least 20° C. while operating at a substantially reduced pressure of approximately 5 to 200 mm. of mercury to further increase the molecular weight of the polymer, (b) melt extruding the resulting polymer product to form a shaped article, and (c) substantially increasing the strength of the shaped article by heating in a non-deleterious gaseous atmosphere at a temperature below the melting temperature of the shaped article for two hours or less.

DESCRIPTION OF PREFERRED EMBODIMENTS

The monomers employed as starting materials in the initial step of the present process are the acetate esters of 6-hydroxy-2-naphthoic acid and 4-hydroxybenzoic acid and possess the following chemical structures wherein monomer I is:

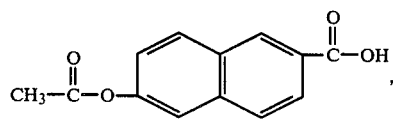

and monomer II is:

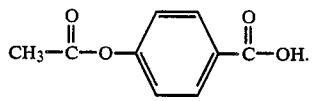

Such monomers conveniently may be formed by the acetylation of the corresponding hydroxyacids in accordance with techniques known in the art, and be named 6-acetoxy-2-naphthoic acid and 4-acetoxybenzoic acid, respectively.

While not specifically illustrated in the structural formulas for monomers I and II at least some of the hydrogen atoms present on aromatic rings may be substituted. Such optional substitution may be an alkyl group of 1 to 4 carbon atoms, an alkoxy group of 1 to 4 carbon atoms, halogen (e.g. Cl, Br, I), phenyl and mixtures of the foregoing. For instance, monomer I may be 6-acetoxy-5-chloro-2-naphthoic acid, 6-acetoxy-5-methyl-2-naphthoic acid, 6-acetoxy-5-methoxy-2-naphthoic acid, 6-acetoxy-7-chloro-2-naphthoic acid, 6-acetoxy-4,7-dichloro-2-naphthoic acid, etc., and monomer II may be 3-chloro-4-acetoxybenzoic acid, 2-chloro-4-acetoxybenzoic acid, 2,3-dichloro-4-acetoxybenzoic acid, 3,5-dichloro-4-acetoxybenzoic acid, 2,5-dichloro-4-acetoxybenzoic acid, 3-bromo-4-acetoxybenzoic acid, 3-methyl-4-acetoxybenzoic acid, 3,5-dimethyl-4-acetoxybenzoic acid, 2,6-dimethyl-4-acetoxybenzoic acid, 3-methoxy-4-acetoxybenzoic acid, 3,5-dimethoxy-4-acetoxybenzoic acid, etc. In a preferred embodiment, no ring substitution is present on monomers I and II.

Representative techniques for forming the 6-hydroxy-2-naphthoic acid from which the 6-acetoxy-2-naphthoic acid may be derived include U.S. Pat. Nos. 1,593,816; 4,287,357; 4,329,494; 4,345,094; and 4,345,095.

Each of the required monomers I and II is provided in the polymerization zone in a concentration of approximately 10 to 90 mole percent based upon the total quantity of monomers present. In preferred embodiments, monomer I is provided in a concentration of approximately 20 to 45 mole percent, and monomer II is provided in a concentration of approximately 55 to 80 mole percent. In a particularly preferred embodiment, monomer I is provided in a concentration of approximately 23 to 27 mole percent, and monomer II is provided in a concentration of approximately 73 to 77 mole percent. Another highly satisfactory embodiment comprises approximately 30 mole percent of monomer I and approximately 70 mole of monomer II. In yet another embodiment approximately 55 to 75 mole percent of moiety I and approximately 25 to 45 mole percent of moiety II are present.

Other aryl ester-forming monomers (e.g., those that form dicarboxy units, dioxy units and/or other combined oxy and carboxy units) other than monomers I and II additionally may be included in the polymerization zone during the formation of the poly(6-oxy-2-naphthoate-4-oxybenzoate) polymer in a minor concentration (e.g., up to about 10 mole percent) so long as such monomers do not adversely influence the desired anisotropic melt phase exhibited by the polymer heretofore defined and do not raise the melting point of the resulting polymer above approximately 370° C. Those monomers which form oxy units in the polymer chain should include acetoxy end groups. As will be apparent to those skilled in the art, the total molar quantities of dicarboxy units and dioxy units present within the polymer product will be substantially equal. Additionally, a minor quantity of another monomer derived from an aromatic hydroxy acid such as meta-acetoxybenzoic optionally may be included in the polymerization zone together with monomers I and II. This component has the propensity to soften the polymer and reduce high order crystallinity thus increasing the amorphous nature of the polymer. The various monomers upon polymer formation will tend to be present in a random configuration.

The polymerization step of the process of the present invention is carried out with the respective monomers being provided primarily in the melt phase and under a non-oxidizing gaseous atmosphere. It is essential if one is to achieve the advantages of the present invention that the monomers during the course of the polymerization be in intimate association with a catalytic quantity of a potassium salt which is capable of catalyzing the polymerization. When such catalyst is employed in combination with the other process parameters specified herein, it has been found that the final heat strengthening step of the present process can be accomplished on an expedited basis as described hereafter.

The potassium salt which is selected to catalyze the polymerization is preferrably a potassium salt of a monocarboxylic acid having from 1 to 20 carbon atoms. In a particularly preferred embodiment the potassium salt of a monocarboxylic acid is potassium acetate. Other representative potassium salts of a monocarboxylic acid which conveniently may be selected include: potassium benzoate, potassium propionate, potassium nonanoate, potassium stearate, etc. The potassium salt of acetic acid is preferred because of its cost, ready availability, and compatibility with the reactants. Any potassium salt which is selected for use in the present process should be capable of disassociation under the melt polymerization conditions.

The potassium salt preferably is provided in the polymerization zone in a concentration such that approximately 25 to 75 parts per million of potassium are provided based upon the total weight of monomers I and II. When potassium acetate is utilized, it preferably is provided in the polymerization zone in a concentration of approximately 0.0025 to 0.0125 percent by weight. In a particularly preferred embodiment when potassium acetate is utilized, it is provided in the polymerization zone in a concentration of approximately 0.0060 to 0.0125 percent be weight.

During the course of the melt polymerization the contents of the reaction zone are stirred or are otherwise agitated in order to bring about a substantially homogeneous admixture of the reactants. Also, during the course of the polymerization the acetic acid by-product is volatilized and is removed from the polymerization zone. Such volatilized acetic acid conveniently may be collected with a condenser or other appropriate device.

The polymerization reaction is carried out at a temperature above 220° C., and initially under substantially atmospheric pressure, which aids in the removal of the acetic acid by-product. It is essential that the polymerization conditions include a relatively high polymerization temperature of at least 320° C. and which exceeds the melting temperature of the polymer product by at least 20° C. (preferably by at least 40° C.) while operating at substantially atmospheric pressure until at least 95 (preferably at least 98) percent of the stoichiometric quantity of acetic acid by-product is evolved and removed from the polymerization zone. The melting temperature of the polymer product may be determined by observation of the peak of the differential scanning calorimetry endotherm while a sample of the polymer product obtained from the polymerization zone is heated at a rate of 20° C./minute under a nitrogen atmosphere.

In a preferred embodiment, the contents of the polymerization zone are heated at progressively elevated temperatures For instance, the contents of the polymerization zone during the course of the polymerization may be heated from 250° C. to 320° C. at a rate of temperature increase of 0.4° C. to 1.2° C. per minute, and preferably at a rate of temperature increase of 0.8° C. to 1.0° C. per minute while under substantially atmospheric pressure.

The polymerization conditions include subsequently heating the contents of the polymerization zone at a temperature of at least 320° C. and which exceeds the melting temperature of the polymer by at least 20° C. (preferably by at least 40° C.) while operating at a substantially reduced pressure of approximately 5 to 200 mm. of mercury to further increase the molecular weight of the product. In a preferred embodiment, the reduced pressure is approximately 80 to 100 mm. of mercury. Also, in preferred embodiments, the contents of the polymerization zone are heated under such reduced pressure conditions for approximately 20 to 40 minutes, and most preferably for approximately 25 to 35 minutes. The polymerization commonly is carried out until the polymer product exhibits an inherent viscosity of at least 4.0 dl./gram when dissolved in a concentration of 0.1 percent by weight in pentafluorophenol at 60° C. In a particularly preferred embodiment the polymer product exhibits an inherent viscosity of approximately 4.0 to 7.0 dl./gram (e.g. 5.0 to 6.0 dl./gram) when dissolved in pentafluorophenol at 60° C.

The poly(6-oxy-2-naphthoate-4-oxybenzoate) product formed in the polymerization step commonly exhibits

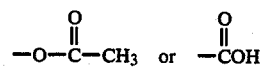

end groups. In all instances the polymer product exhibits an anisotropic melt phase.

While it has generally been known in the past to employ polymerization conditions in the temperature range of 250° C. to 320° C. when forming poly(6-oxy-2-naphthoate-4-benzoate) under melt polymerization conditions as described in U.S. Pat. No. 4,161,470, it surprisingly has been found that the final polymerization temperature at a minimum should equal or exceed 320° C., and preferably should equal or exceed 325° C. when combined with the other polymerization conditions stated in order to obtain the benefits of the present invention. The resulting polymer product has been found to be particularly amenable to the formation of quality shaped articles which subsequently may be heat strengthened in an unusually brief period of time. The theory whereby this advantageous result is achieved is considered to be complex and incapable of simple explanation.

The resulting polymer product next is melt extruded to form a shaped article which may take the form of fiber, film, three-dimensional shaped article, etc. The polymer melt commonly is provided at a temperature approximately 5° to 50° C. in excess of the melting temperature of such polymer at the time of the melt extrusion. When forming fibers and films the extrusion orifice may be selected from among those commonly utilized during the melt extrusion of such shaped articles. For instance, the extrusion orifice may be in the form of a rectangular slit when forming a polymer film. When forming a three dimensional shaped article, the molten polymer is extruded into an appropriate mold cavity and is allowed to cool to form a solid article having a configuration which corresponds to the shape of the mold cavity. When forming a filamentary material, the spinneret selected may contain one and preferably a plurality of extrusion orifices. For instance, a standard spinneret containing approximately 6 to 500, or more, holes such as commonly used in the melt spinning of polyethylene terephthalate having a diameter of about 1 to 60 mils (e.g. 5 to 40 mils) may be utilized. Continuous filament yarns of about 20 to 500 filaments may be formed.

Subsequent to melt extrusion the resulting filamentary material or film is passed in the direction of its length through a solidification or quench zone wherein the molten filamentary material or film is transformed to a solid filamentary material or film. The resulting filaments commonly possess a denier per filament of about 1 to 50, and preferably a denier per filament of approximately 3 to 7 (e.g., approximately 5). The actual denier per filament selected will be influenced by the intended end use.

When forming three-dimensional shaped articles the polymer product prior to melt extrusion optionally may incorporate approximately 1 to 60 percent by weight of a solid filler (e.g., talc) and/or reinforcing agent (e.g., glass fibers).

The strength of the resulting shaped article next is substantially increased by heating in a non-deleterious gaseous atmosphere at a temperature below the melting temperature of the shaped article for an unusually brief period of time. Such gaseous atmosphere preferably is flowing during the heat strengthening step. Representative gaseous atmospheres which may be employed are nitrogen, argon, helium, carbon dioxide, substantially moisture free-air, moisture free plant gas, etc., and mixtures of these. The shaped article may be simply positioned within the heated gaseous atmosphere during such a heat strengthening step. For best results, the heated gaseous atmospheric is flowing or periodically changed in order to remove by-products which are evolved during the heat strengthening step. Fibrous materials may be wound on a heat resistant bobbin or continuously passed through the zone where heat treatment takes place in the direction of their length while being suspended therein. When practicing the heat strengthening step of the present invention, deleterious coalescence or sticking between adjoining filaments, such as is frequently observed in the prior art, can be avoided. When sticking occurs, the yarns are difficult to twist, exhibit lower mechanical properties, are stiff, and weave poorly. Accordingly, when practicing the present invention, a fibrous material prior to the heat strengthening step advantageously can be wound upon a given bobbin in a greater quantity using a greater winding tension than otherwise would be possible. Both process output and product quality are improved.

At a given point in time, the temperature of the gaseous atmosphere will be below the then melting temperature of the shaped article. It should be understood, however, that the temperature of the gaseous atmosphere optionally can be progressively raised during the heat strengthening step as the actual melting temperature of the shaped article rises.

During such heat strengthening step, the gaseous atmosphere commonly is provided at a temperature which is 10° C. to 60° C. below the melting temperature of the shaped article. In a preferred embodiment the gaseous atmosphere is provided at a temperature which is approximately 10° C. to 30° C. below the melting temperature.

The duration of such heat strengthening step unlike that commonly practiced in the prior art is two hours or less, and preferably is one hour or less. Optimim heat treatment temperatures and times for a given shaped article may be determined by routine experimentation within the parameters specified. It commonly has been observed with the process of the present invention that such optimum strength levels are achieved within a relatively brief period of time and are subsequently decreased as the heating continues.

During such heat strengthening step the strength of the shaped article preferably is increased by at least 25 percent, and most preferably by at least 50 percent (e.g., at least 100 percent when a fibrous material is involved). The tenacity of a fibrous material may be determined in accordance with ASTM D-3822. The tensile strength of a three-dimensional molded article may be determined in accordance with ASTM D-638.

The following data illustrates highly satisfactory results which can be achieved when practicing the claimed process. More specifically, a series of polymerization reactions were conducted wherein poly(6-oxy-2-naphthoate-4-oxybenzoate) was formed with and without the presence of a potassium salt catalyst while employing two different rates of temperature increase until the maximum polymerization temperature (i.e., 340° C.) was achieved. In each instance filaments were melt extruded from the polymer product and heat strengthening was conducted under three different sets of conditions.

Each polymerization run was carried out in a 300 ml. round bottom flask equipped with a glass paddle stirrer, nitrogen inlet tube, and distillation head connected to a condenser. In each run the following monomers were provided in the flask (a) 31.1 grams of 6-acetoxy-2-naphthoic acid (0.135 mole), and (b) 65.8 grams of 4-acetoxybenzoic acid (0.365 mole).

The polymerization runs were carried out under a flowing nitrogen atmosphere with the monomers and polymer product being in the melt phase. In some runs 0.013 grams of potassium acetate catalyst were provided in intimate admixture with the monomers (i.e., in a concentration of approximately 0.0125 percent by weight).

The contents of the flasks were heated with stirring by external oil baths in accordance with either of a pair of controlled temperature profiles. In each instance the contents of the flask were heated to 250° C. under substantially atmospheric pressure. In accordance with a slow temperature profile the contents of the flask were heated from 250° C. to 340° C. at a rate of 0.5° C./minute while under substantially atmospheric pressure. In accordance with a fast temperature profile the contents of the flask were heated from 250° C. to 340° C. at a rate of 1.0° C./minute while under substantially atmospheric pressure The acetic acid by-product was withdrawn from the polymerization zone and was collected in the condenser outside the polymerization zone. In each instance when the contents of the flask reached 340° C. in excess of 95 percent of the stoichiometric quantity of acetic acid by-products had been evolved and removed from the flask.

When the contents of the flasks reached 340° C. the pressure of the nitrogen atmosphere within the flasks was reduced to 100 mm. of mercury, and the heating was continued at approximately 340° C. for 20 minutes during which time the molecular weight of the polymer products was further increased. The resulting polymer products exhibited an anisotropic melt phase and melting temperatures of 280.0° C. When dissolved in pentafluorophenol in a concentration of 0.1 percent by weight at 60° C., the polymer products exhibited the inherent viscosities indicated in the Table.

Each polymer sample was melt extruded into a continuous filament of approximately 5 denier. More specifically, each polymer sample while at a temperature of approximately 310° C. was extruded through a spinneret provided with a single hole of 5 mils diameter and having a length of 7 mils at a throughput rate of 0.15 g./min. The extruded filaments were quenched in air at 20° C., and the as-spun filaments were taken up at a rate of 260 meters per minute.

The resulting filaments next were heat strengthened in flowing nitrogen atmospheres at temperatures below the melting temperatures of the filaments as indicated in the Table. The mechanical properties of the filaments before and after heat strengthening are indicated in the Table as are the melting temperatures of the filaments before and after the heat strengthening. The tenacity, elongation, and tensile modulus values were determined in accordance with ASTM D-3822.

TABLE

| Run No. | Potassium Acetate Catalyst | Polymerization Temperature Profile | Inherent Viscosity dl./gram | Heat Strengthening Treatment | Tenacity (grams/ denier) | Elongation (percent) | Tensile Modulus (grams/ denier) | Melting Temperature of Product |
|---|---|---|---|---|---|---|---|---|
| 1 | no | slow | 5.32 | none | 9.7 | 2.1 | 568 | 280.0° C. |
| 2 | no | slow | 5.32 | 2 hrs. 260° C. | 10.5 | 2.4 | 478 | 285.7° C. |
| 3 | no | slow | 5.32 | 4 hrs. 270° C. | 11.4 | 2.9 | 476 | 305.9° C. |
| 4 | no | slow | 5.32 | 2 hrs. 250° C. + 16 hrs. 280° C. | 19.1 | 4.0 | 474 | 337.0° C. |
| 5 | no | fast | 6.37 | none | 10.6 | 2.3 | 577 | 280.0° C. |
| 6 | no | fast | 6.37 | 2 hrs. 260° C. | 10.8 | 2.4 | 479 | 284.8° C. |
| 7 | no | fast | 6.37 | 4 hrs. 270° C. | 13.1 | 2.9 | 501 | 305.3° C. |
| 8 | no | fast | 6.37 | 2 hrs. 250° C. + 16 hrs. 280° C. | 20.3 | 4.5 | 466 | 315.3° C. |
| 9 | yes | slow | 5.65 | none | 11.7 | 2.6 | 541 | 280.0° C. |
| 10 | yes | slow | 5.65 | 2 hrs. 260° C. | 23.4 | 4.7 | 565 | 313.6° C. |
| 11 | yes | slow | 5.65 | 4 hrs. 270° C. | 21.0 | 4.3 | 536 | 326.4° C. |
| 12 | yes | slow | 5.65 | 2 hrs. 250° C. + 16 hrs. 280° C. | 16.9 | 3.4 | 512 | 330.8° C. |
| 13 | yes | fast | 6.14 | none | 11.5 | 2.6 | 562 | 280.0° C. |
| 14 | yes | fast | 6.14 | 2 hrs. 260° C. | 22.2 | 4.7 | 581 | 312.7° C. |
| 15 | yes | fast | 6.14 | 4 hrs. 270° C. | 23.0 | 4.8 | 526 | 325.3° C. |
| 16 | yes | fast | 6.14 | 2 hrs. 250° C. + 16 hrs. 280° C. | 20.7 | 3.9 | 558 | 332.4° C. |

Run Nos. 10 and 14 were carried out in accordance with the concept of the present invention. The remaining Runs are presented for comparative purposes only. The data indicates that the utilization of a potassium salt catalyst in combination with the other process parameters yields as-spun product which is substantially more amenable to heat strengthening on an expedited basis. The substantially higher strength values are particularly noteworthy. When Run Nos. 11, 12, 15 and 16 are compared with Run Nos. 10 and 14, it is seen that a heat strengthening treatment beyond two hours in duration yields no substantial increase in tenacity and commonly results in reduced tenacity and/or tensile modulus values. Also such extended heat treatments beyond two hours in duration markedly decrease the productivity of a given facility. It further is seen from the data that when the fast temperature profile is selected that the heat strengthened product is more resistant to tenacity loss upon extended heat treatment which imparts an added degree of stability in the overall process. Also, it is seen that generally higher tensile moduli values are obtained when practicing the concept of the present invention which are well retained even upon extended heat treatment. Finally, there was no undesirable coalescence or sticking between adjoining filaments when practicing the process of the present invention.

Although the invention has been described with preferred embodiments, it is to be understood that variations and modifications may be employed without departing from the concept of the invention as defined in the following claims.

We claim:

1. An improved process for the expeditious formation of a high strength shaped article of poly(6-oxy-2-naphthoate-4-oxybenzoate) which is capable of forming an anisotropic melt phase comprising:

(a) polymerizing under melt polymerization conditions in a polymerization zone at a temperature above 220° C. approximately 10 to 90 mole percent of monomer I and approximately 10 to 90 mole percent of monomer II with the evolution of acetic acid by-product, wherein monomer I is:

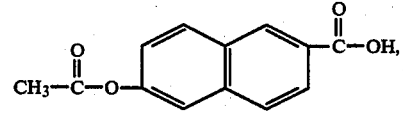

and monomer II is:

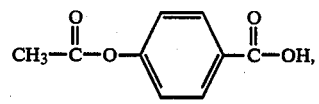

with the polymerization being conducted under a non-oxidizing gaseous atmosphere in the presence of a catalytic quantity of a potassium salt which is capable of catalyzing the polymerization, with said polymerization conditions including a polymerization temperature of at least 320° C. and which exceeds the melting temperature of the polymer product by at least 20° C. while operating at substantially atmospheric pressure until at least 95 percent of the stoichiometric quantity of acetic acid by-product is evolved and removed from said polymerization zone, and a subsequent polymerization temperature of at least 320° C. and which exceeds the melting temperature of the polymer by at least 20° C. while operating at a substantially reduced pressure of approximately 5 to 200 mm. of mercury to further increase the molecular weight of the polymer, (b) melt extruding the resulting polymer product to form a shaped article, and (c) increasing the strength of said shaped article by at least 50 percent by heating in a non-deleterious gaseous atmosphere at a temperature below the melting temperature of said shaped article for two hours or less.

2. An improved process for the expeditious formation of a high strength shaped article of poly(6-oxy-2-naphthoate-4-oxybenzoate) according to claim 1, wherein monomer I is provided in said polymerization zone in a concentration of approximately 20 to 45 mole percent and monomer II is provided in said polymerization zone in a concentration of approximately 55 to 80 mole percent.

3. An improved process for the expeditious formation of a high strength shaped article of poly(6-oxy-2-naphthoate-4-oxybenzoate) according to claim 1, wherein monomer I is provided in said polymerization zone in a concentration of approximately 23 to 27 mole percent and monomer II is provided in said polymerization zone in a concentration of approximately 73 to 77 mole percent.

4. An improved process for the expeditious formation of a high strength shaped article of poly(6-oxy-2-naphthoate-4-oxybenzoate) according to claim 1, wherein the aromatic rings of monomers I and II are free of ring substitution.

5. An improved process for the expeditious formation of a high strength shaped article of poly(6-oxy-2-naphthoate-4-oxybenzoate) according to claim 1, wherein the non-oxidizing gaseous atmosphere provided in said polymerization zone is nitrogen.

6. An improved process for the expeditious formation of a high strength shaped article of poly(6-oxy-2-naphthoate-4-oxybenzoate) according to claim 1, wherein said potassium salt is provided in said polymerization zone in a concentration such that approximately 25 to 75 parts per million of potassium are provided based upon the total weight of monomers I and II.

7. An improved process for the expeditious formation of a high strength shaped article of poly(6-oxy-2-naphthoate-4-oxybenzoate) according to claim 1, wherein said potassium salt is potassium acetate.

8. An improved process for the expeditious formation of a high strength shaped article of poly(6-oxy-2-naphthoate-4-oxybenzoate) according to claim 1, wherein the contents of said polymerization zone during the course of said polymerization are heated from 250° C. to 320° C. at a rate of temperature increase of approximately 0.4° C. to 1.2° C. per minute.

9. An improved process for the expeditious formation of a high strength shaped article of poly(6-oxy-2-naphthoate-4-oxybenzoate) according to claim 1, wherein the contents of said polymerization zone during the course of said polymerization are heated from 250° C. to 320° C. at a rate of temperature increase of approximately 0.8° C. to 1.0° C. per minute.

10. An improved process for the expeditious formation of a high strength shaped article of poly(6-oxy-2-naphthoate-4-oxybenzoate) according to claim 1, wherein said polymerization conditions include a polymerization temperature of at least 320° C. and which exceeds the melting temperature of the polymer product by at least 40° C. while operating at a substantially atmospheric pressure until at least 95 percent of the stoichiometric quantity of acetic acid by-product is evolved and removed from the polymerization zone.

11. An improved process for the expeditious formation of a high strength shaped article of poly(6-oxy-2-naphthoate-4-oxybenzoate) according to claim 1, wherein said polymerization conditions include a polymerization temperature of at least 320° C. and which exceeds the melting temperature of the polymer product by at least 40° C. while operating at a substantially atmospheric pressure until at least 98 percent of the stoichiometric quantity of acetic acid by-product is evolved and removed from the polymerization zone.

12. An improved process for the expeditious formation of a high strength shaped article of poly(6-oxy-2-naphthoate-4-oxybenzoate) according to claim 1, wherein said polymerization conditions include a subsequent polymerization temperature of at least 320° C. and which exceeds the melting temperature of the polymer product by at least 20° C. while operating at a substantially reduced pressure of approximately 80 to 120 mm. of mercury to further increase the molecular weight of the polymer product.

13. An improved process for the expeditious formation of a high strength shaped article of poly(6-oxy-2-naphthoate-4-oxybenzoate) according to claim 1, wherein said polymerization conditions include a subsequent polymerization temperature of at least 320° C. and which exceeds the melting temperature of the polymer product by at least 40° C. while operating at a substantially reduced pressure of approximately 80 to 100 mm. of mercury to further increase the molecular weight of the polymer product.

14. An improved process for the expeditious formation of a high strength shaped article of poly(6-oxy-2-naphthoate-4-oxybenzoate) according to claim 1, wherein said resulting polymer product produced in said polymerization zone in step (a) exhibits an inherent viscosity of at least 4.0 dl./gram when dissolved in a concentration of 0.1 percent by weight in pentafluorophenol at 60° C.

15. An improved process for the expeditious formation of a high strength shaped article of poly(6-oxy-2-naphthoate-4-oxybenzoate) according to claim 1, wherein said resulting polymer product produced in said polymerization zone in step (a) exhibits an inherent viscosity in the range of approximately 4.0 to 7.0 dl./gram when dissolved in a concentration of 0.1 percent by weight in pentafluorophenol at 60° C.

16. An improved process for the expeditious formation of a high strength shaped article of poly(6-oxy-2-naphthoate-4-oxybenzoate) according to claim 1, wherein said shaped article produced in step (b) is a multifilamentary fibrous material.

17. An improved process for the expeditious formation of a high strength shaped article of poly(6-oxy-2-naphthoate-4-oxybenzoate) according to claim 1, wherein said shaped article produced in step (b) is a film.

18. An improved process for the expeditious formation of a high strength shaped article of poly(6-oxy-2-naphthoate-4-oxybenzoate) according to claim 1, wherein said shaped article produced in step (b) is a three-dimensional molded article.

19. An improved process for the expeditious formation of a high strength shaped article of poly(6-oxy-2-naphthoate-4-oxybenzoate) according to claim 1, wherein in step (c) said shaped article is heated in said non-deleterious gaseous atmosphere which is provided at a temperature which is approximately 10° C. to 60° C.

below the melting temperature of said shaped article for two hours or less.

20. An improved process for the expeditious formation of a high strength shaped article of poly(6-oxy-2-naphthoate-4-oxybenzoate) according to claim 1, wherein in step (c) said shaped article is heated in a non-deleterious gaseous atmosphere which is selected from the group consisting of nitrogen, argon, helium, carbon dioxide, and substantially moisture-free air.

21. An improved process for the expeditious formation of a high strength shaped article of poly(6-oxy-2-naphthoate-4-oxybenzoate) according to claim 1, wherein in step (c) said heating of said shaped article is conducted for one hour or less.

22. An improved process for the expeditious formation of a high strength multifilamentary fibrous material of poly(6-oxy-2-naphthoate-4-oxybenzoate) which is capable of forming an anisotropic melt phase comprising:

(a) polymerizing under melt polymerization conditions in a polymerization zone at a temperature above 220° C. approximately 23 to 27 mole percent of monomer I and approximately 73 to 77 mole percent of monomer II with the evolution of acetic acid by-product, wherein monomer I is:

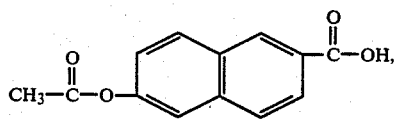

and monomer II is:

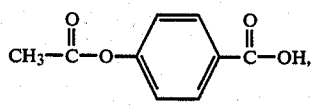

with the polymerization being conducted under a non-oxidizing gaseous atmosphere in the presence of approximately 0.0025 to 0.0125 percent by weight of potassium acetate catalyst, with said polymerization conditions including heating the contents of the polymerization zone from 250° C. to 320° C. at a rate of temperature increase of approximately 0.4° C. to 1.2° C. per minute, a polymerization temperature of at least 320° C. while operating at substantially atmospheric pressure until at least 95 percent of the stoichiometric quantity of acetic acid by-product is evolved and removed from said polymerization zone, and a subsequent polymerization temperature of at least 320° C. while operating at a substantially reduced pressure of approximately 80 to 120 mm. of mercury to further increase the molecular weight of the polymer to yield a polymer product which exhibits an inherent viscosity of at least 4.0 dl./gram when dissolved in a concentration of 0.1 percent by weight in pentafluorophenol at 60° C., (b) melt extruding the resulting polymer product through a plurality of orifices to form an as-spun multifilamentary fibrous material of 6 to 500 continuous filaments each having a denier of approximately 3 to 7, and (c) substantially increasing the tenacity of said as-spun multifilamentary fibrous material by at least 50 percent by heating in a non-deleterious gaseous atmosphere selected from the group consisting of nitrogen, argon, helium, carbon dioxide, and substantially moisture free-air at a temperature which is approximately 10° C. to 60° C. below the melting temperature of said as-spun multifilamentary fibrous material for two hours or less.

23. An improved process for the expeditious formation of a high strength multifilamentary fibrous material of poly(6-oxy-2-naphthoate-4-oxybenzoate) according to claim 22, wherein the aromatic rings of monomers I and II are free of ring substitution.

24. An improved process for the expeditious formation of a high strength multifilamentary fibrous material of poly(6-oxy-2-naphthoate-4-oxybenzoate) according to claim 22, wherein said potassium acetate catalyst is provided in said polymerization zone of step (a) in a concentration of approximately 0.0060 to 0.0125 percent by weight.

25. An improved process for the expeditious formation of a high strength multifilamentary fibrous material of poly(6-oxy-2-naphthoate-4-oxybenzoate) according to claim 22, wherein in step (a) the contents of said polymerization zone are heated from 240° C. to 300° C. at a rate of temperature increase of approximately 0.8° C. to 1.0° C. per minute.

26. An improved process for the expeditious formation of a high strength multifilamentary fibrous material of poly(6-oxy-2-naphthoate-4-oxybenzoate) according to claim 22, wherein step (a) said substantially reduced pressure is approximately 100 mm. of mercury and said subsequent polymerization is conducted at a temperature of at least 320° C. at such pressure for approximately 20 to 40 minutes to yield a polymer product which exhibits an inherent viscosity of approximately 4.0 to 7.0 dl./gram when dissolved in pentafluorophenol at 60° C.

27. An improved process for the expeditious formation of a high strength multifilamentary fibrous material of poly(6-oxy-2-naphthoate-4-oxybenzoate) according to to claim 22, wherein in step (b) said the continuous filaments of said multifilamentary fibrous material have a denier of approximately 5.

28. An improved process for the expeditious formation of a high strength multifilamentary fibrous material of poly(6-oxy-2-naphthoate-4-oxybenzoate) according to claim 22, wherein in step (c) said heating of said as-spun multifilamentary fibrous material is conducted for one hour or less.

* * * * *